United States Patent
Asanuma et al.

(10) Patent No.: US 10,020,692 B2
(45) Date of Patent: Jul. 10, 2018

(54) FOREIGN OBJECT DETECTOR, POWER TRANSMITTER, POWER RECEIVER, AND WIRELESS POWER TRANSMISSION SYSTEM

(71) Applicant: Panasonic Intellectual Property Management Co., Ltd., Osaka (JP)

(72) Inventors: Kenichi Asanuma, Osaka (JP); Atsushi Yamamoto, Kyoto (JP); Hiroshi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 270 days.

(21) Appl. No.: 14/904,581

(22) PCT Filed: Mar. 5, 2014

(86) PCT No.: PCT/JP2014/001211
§ 371 (c)(1),
(2) Date: Jan. 12, 2016

(87) PCT Pub. No.: WO2015/132818
PCT Pub. Date: Sep. 11, 2015

(65) Prior Publication Data
US 2016/0149442 A1 May 26, 2016

(51) Int. Cl.
*G01V 3/10* (2006.01)
*H02J 5/00* (2016.01)
(Continued)

(52) U.S. Cl.
CPC ............. *H02J 50/60* (2016.02); *G01V 3/10* (2013.01); *H02J 5/005* (2013.01); *H02J 7/025* (2013.01); *H02J 17/00* (2013.01); *H02J 50/12* (2016.02)

(58) Field of Classification Search
CPC .. G01V 3/10; H02J 5/005; H02J 7/025; H02J 17/00; H02J 50/12; H02J 50/60
(Continued)

(56) References Cited

U.S. PATENT DOCUMENTS 4,678,992 A 7/1987 Hametta
4,839,602 A 6/1989 Pletcher
(Continued)

FOREIGN PATENT DOCUMENTS

JP H05-327349 12/1993
JP 2005-140701 A 6/2005
(Continued)

OTHER PUBLICATIONS

Extended European Search Report dated Jan. 31, 2017 for corresponding European Application No. 14884962.3.
(Continued)

*Primary Examiner* — Levi Gannon
(74) *Attorney, Agent, or Firm* — Renner Otto Boisselle & Sklar, LLP

(57) ABSTRACT

A foreign object detector includes: an oscillator circuit 100 having a coil 110 and resonant capacitors Cx, Cy, the oscillator circuit 100 being configured to output a voltage which includes an AC component and a DC component, the AC component having a positive cycle and a negative cycle; and an electric circuit for sensing a variation of the AC component and a variation of the DC component in the voltage output from the oscillator circuit 100 when a foreign object approaches the coil 110.

15 Claims, 9 Drawing Sheets

(51) Int. Cl.
*H02J 7/02* (2016.01)
*H02J 50/60* (2016.01)
*H02J 50/12* (2016.01)
*H02J 17/00* (2006.01)

(58) Field of Classification Search
USPC ............................................ 307/104
See application file for complete search history.

(56) References Cited

U.S. PATENT DOCUMENTS

| | | | |
|---|---|---|---|
| 5,180,978 A | 1/1993 | Postma et al. | |
| 6,014,022 A | 1/2000 | Demma et al. | |
| 9,806,542 B2* | 10/2017 | Asanuma | H02J 5/005 |
| 9,831,704 B2* | 11/2017 | Uramoto | H02J 5/005 |
| 2005/0099278 A1 | 5/2005 | Kawaura et al. | |
| 2009/0175060 A1 | 7/2009 | Onishi et al. | |
| 2012/0313579 A1* | 12/2012 | Matsumoto | H02J 5/005 |
| | | | 320/108 |
| 2012/0326524 A1* | 12/2012 | Matsumoto | H01M 10/425 |
| | | | 307/104 |
| 2014/0001881 A1 | 1/2014 | Murakami et al. | |
| 2014/0077617 A1 | 3/2014 | Nakano et al. | |
| 2014/0159501 A1* | 6/2014 | Kanno | H02J 17/00 |
| | | | 307/104 |
| 2015/0028875 A1 | 1/2015 | Irie et al. | |
| 2015/0349543 A1* | 12/2015 | Sakata | H02J 5/005 |
| | | | 307/104 |
| 2016/0164302 A1* | 6/2016 | Nakano | G01V 3/10 |
| | | | 307/104 |

FOREIGN PATENT DOCUMENTS

| | | |
|---|---|---|
| JP | 2009-189229 A | 8/2009 |
| JP | 2012-213270 A | 11/2012 |
| JP | 2012-244732 A | 12/2012 |
| JP | 2013-188072 A | 9/2013 |
| WO | WO 2012/132818 A1 | 10/2012 |

OTHER PUBLICATIONS

International Search Report for corresponding International Application No. PCT/JP2014/001211 dated May 27, 2014.

* cited by examiner (a)

(b)

(c)

(a)

(b)

(c)

(b)

(c)

| FOREIGN OBJECT | CONSTANT CURRENT CIRCUIT | Vac[mV] | Vdc[mV] |
|---|---|---|---|
| NONE | NOT INCLUDED/ INCLUDED | 1313 | 2218 |
| IRON | NOT INCLUDED | 772 (▲541) | 2160 (▲58) |
| IRON | INCLUDED | 715 (▲598) | 2010 (▲208) |
| ALUMINUM FOIL | NOT INCLUDED | 480 (▲833) | 2118 (▲100) |
| ALUMINUM FOIL | INCLUDED | 413 (▲900) | 1837 (▲381) |

FOREIGN OBJECT DETECTOR, POWER TRANSMITTER, POWER RECEIVER, AND WIRELESS POWER TRANSMISSION SYSTEM

TECHNICAL FIELD

The present disclosure relates to a foreign object detector for detecting a foreign object which is present in a vicinity of a coil. The present disclosure also relates to a power transmitter, power receiver, and wireless power transmission system which include such a foreign object detector and which are designed for wireless power transmission, i.e., transmission of electric power in a contactless manner.

BACKGROUND ART

In recent years, development of wireless power transmission technology which employs induction coupling between coils has been encouraged for the purpose of charging, by wireless, electronic devices and EV devices which involve mobility, such as mobile phones and electric vehicles. A wireless power transmission system includes a power transmitter which has a power transmitting coil (power transmitting antenna) and a power receiver which has a power receiving coil (power receiving antenna) and is configured such that a magnetic field produced by the power transmitting coil is caught by the power receiving coil, whereby transmission of electric power is realized without direct contact of electrodes.

Patent Document 1 discloses an example of such a wireless power transmission system.

CITATION LIST

Patent Literature

Patent Document 1: Japanese Laid-Open Patent Publication No. 2012-244732

SUMMARY OF INVENTION

Technical Problem

In the wireless power transmission system, when a metallic foreign object is present in a vicinity of the power transmitting coil or the power receiving coil in transmission of electric power, an eddy current occurs in the metallic foreign object, leading to the risk of heating the foreign object. Also, when a human body is present in a vicinity of the power transmitting coil or the power receiving coil during transmission of electric power, there is a risk of causing an induced current in the human body. Therefore, detection of a foreign object, such as a metallic object or human body, in a vicinity of the coil is an indispensable function for achieving safe and highly efficient wireless power transmission.

In view of the above problem, Patent Document 1 discloses measuring the primary-side Q factor of a circuit that includes a primary-side coil which is electromagnetically coupled with a secondary-side coil, correcting the power transmission efficiency with the Q factor of the primary-side coil, and detecting the state of being electromagnetically coupled with the secondary-side coil based on a resultant correction value.

However, the method of Patent Document 1 has the problem of low foreign object detection sensitivity because an AC voltage is used for measurement of the Q factor and only the variation of the AC component is considered as an index for detection of foreign objects in a vicinity of the coil.

An embodiment of the present disclosure provides a foreign object detector which is capable of detecting a foreign object, such as a metallic object or human body, in a vicinity of a coil with high sensitivity. Other embodiments of the present disclosure provide a power transmitter and a power receiver for wireless power transmission, and a wireless power transmission system, which include such a foreign object detector.

Solution to Problem

In order to solve the above-described problems, a foreign object detector according to an embodiment of the present disclosure includes: an oscillator circuit having a coil and a resonant capacitor, the oscillator circuit being configured to output a voltage which includes an AC component and a DC component, the AC component having a positive cycle and a negative cycle; and an electric circuit for detecting a variation of the AC component and a variation of the DC component in the voltage output from the oscillator circuit when a foreign object approaches the coil.

The above-described common and specific embodiment is implemented using a system, method, and computer program, or can be realized using a combination of a system, method, and computer program.

Advantageous Effects of Invention

According to an embodiment of the present disclosure, the variation of the AC component (positive cycle and/or negative cycle) of a voltage which occurs when a foreign object, such as a metallic object or human body, is present in a vicinity of a coil and, in addition, the variation of the DC component are detected, so that the foreign object which is present in a vicinity of the coil can be detected with high sensitivity.

BRIEF DESCRIPTION OF DRAWINGS

FIG. 6(a) shows a circuit configuration. FIG. 6(b) shows an example of the variation over time of voltage Vin_X at a point X. FIG. 6(c) shows an example of the variation over time of voltage Vin_X which occurs when a metallic foreign object is present in a vicinity of a coil 110.

FIG. 7(a) shows a circuit configuration. FIG. 7(b) shows an example of the variation over time of voltage Vin_X' at a point X'. FIG. 7(c) shows an example of the variation over time of voltage Vin_X' which occurs when a metallic foreign object is present in a vicinity of the coil 110.

FIG. 8(a) shows a circuit configuration. FIG. 8(b) shows an example of the variation over time of voltage Vin_X' at a point X'. FIG. 8(c) shows an example of the variation over time of voltage Vin_X' which occurs when a metallic foreign object is present in a vicinity of the coil 110.

DESCRIPTION OF EMBODIMENTS

Figure 1:
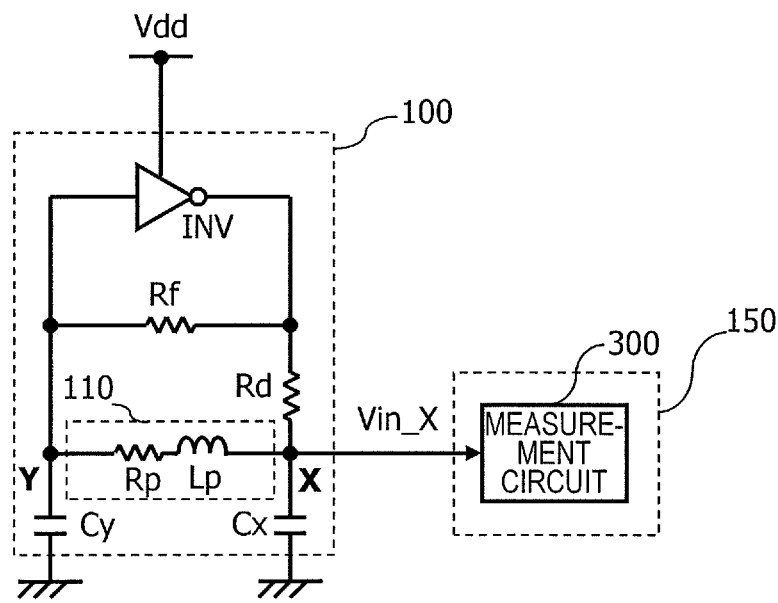
FIG. 1 is a circuit diagram showing a general configuration of a foreign object detector according to Embodiment 1 of the present disclosure.

As described above, in the wireless power transmission system, it is necessary to surely detect a foreign object, such as a metallic object or human body (including animal body), in a vicinity of the coil. In view of this demand, among conventional detecting circuits represented by Patent Document 1, a determination method that considers the variation of the AC component of the oscillation voltage which occurs when a metallic foreign object is present in a vicinity of a coil has been a major solution. In an embodiment of the present application, an oscillator circuit is configured such that the DC component of the oscillation voltage varies as well as the AC component when a foreign object is present in a vicinity of a coil, and a measurement circuit which is capable of measuring both the variation of the AC component and the variation of the DC component is used. Such a configuration enables detection of a foreign object which is present in a vicinity of the coil with high sensitivity in an embodiment of the present disclosure. According to other embodiments of the present disclosure, a power transmitter and a power receiver for wireless power transmission, and a wireless power transmission system, which include such a foreign object detector, can be realized.

The summary of embodiments of the present application is as follows.

(1) A foreign object detector according to an embodiment of the present disclosure includes: an oscillator circuit having a coil and a resonant capacitor, the oscillator circuit being configured to output a voltage which includes an AC component and a DC component, the AC component having a positive cycle and a negative cycle; and an electric circuit that detects a variation of the AC component and a variation of the DC component in the voltage output from the oscillator circuit when a foreign object approaches the coil.

(2) In one embodiment, the electric circuit includes a rectifier circuit that rectifies the voltage output from the oscillator circuit and outputting the rectified voltage, and the rectifier circuit includes a first rectifier element for rectifying a voltage of the positive cycle, a first capacitor for reducing the DC component, and a second rectifier element for rectifying a voltage of the negative cycle which is smaller than zero due to reduction of the DC component.

(3) In one embodiment, the rectifier circuit further includes a second capacitor for smoothing a voltage output from the first rectifier element, and a voltage division ratio between the first capacitor and the second capacitor, U, satisfies the relationship of 0<U≤0.5.

(4) In one embodiment, the electric circuit further includes a measurement circuit that directly or indirectly measures a voltage output from the oscillator circuit.

(5) In one embodiment, the electric circuit further includes a measurement circuit that measures the voltage output from the rectifier circuit.

(6) In one embodiment, the oscillator circuit further includes a resistance Rd which is arranged so as to decrease the voltage output from the oscillator circuit, and the resistance Rd is set such that, when the foreign object is sufficiently distant from the coil, a voltage input to the measurement circuit is within a measurable range of the measurement circuit and, when a foreign object which is larger than the coil is in close contact with the coil, the voltage is not less than a lower limit of the measurable range.

(7) In one embodiment, the measurement circuit outputs information indicating that the a foreign object is present when a difference between a voltage input to the measurement circuit and a predetermined reference voltage is not less than a predetermined threshold.

(8) In one embodiment, the resonant capacitor is a first resonant capacitor, the oscillator circuit further includes a second resonant capacitor which has a different capacitance from that of the first resonant capacitor, one electrode of the first resonant capacitor is connected to the coil and an output terminal of the oscillator circuit, and the first and second resonant capacitors are connected in parallel to the coil.

(9) In one embodiment, the first resonant capacitor has capacitance Cx and the second resonant capacitor has capacitance Cy=αCx, and α is set to a value within the range of 1≤α≤100.

(10) In one embodiment, the first resonant capacitor has capacitance Cx and the second resonant capacitor has capacitance Cy=αCx, and α is set to a value within the range of 0.01≤α<1.

(11) In one embodiment, the coil is configured to also function as a power transmitting coil for transmitting electric power wirelessly, the foreign object detector further includes a switch for switching an electrical connection between the coil and the oscillator circuit, and the switch is configured to electrically connect the coil to the oscillator circuit in a foreign object detection mode and to electrically separate the coil from the oscillator circuit in a power transmission mode.

(12) In one embodiment, the coil is configured to also function as a power receiving coil for receiving electric power by wireless, the foreign object detector further includes a switch for switching an electrical connection between the coil and the oscillator circuit, and the switch is configured to electrically connect the coil to the oscillator circuit in a foreign object detection mode and to electrically separate the coil from the oscillator circuit in a power transmission mode.

(13) A power transmitter according to another embodiment of the present disclosure is a power transmitter for transmitting electric power by wireless, including: the foreign object detector as set forth in any of above paragraphs (1) to (11); and a control circuit that determines a power transmission frequency and a power transmission voltage according to a detection result from the foreign object detector.

(14) A power receiver according to still another embodiment of the present disclosure is a power receiver for receiving electric power transmitted by wireless from a power transmitter, including: the foreign object detector as set forth in any of above paragraphs (1) to (11) or (12); and a control circuit that generates information for power transmission control according to a detection result from the foreign object detector and outputs the generated information.

(15) A wireless power transmission system according to still another embodiment of the present disclosure includes: a power transmitter that transmits electric power by wireless; and a power receiver that receives the electric power transmitted from the power transmitter, wherein the power transmitter is the power transmitter as set forth in paragraph (13).

(16) A wireless power transmission system according to still another embodiment of the present disclosure includes: a power transmitter that transmits electric power by wireless; and a power receiver that receives the electric power transmitted from the power transmitter, wherein the power receiver is the power receiver as set forth in paragraph (14).

Hereinafter, specific embodiments of the present invention are described with reference to the drawings. Note that equivalent components are denoted by the same reference numerals.

Embodiment 1

FIG. 1 is a circuit diagram showing a general configuration of a foreign object detector according to Embodiment 1 of the present disclosure. This foreign object detector can be used in, for example, a power transmitter or power receiver of a wireless power transmission system, for the purpose of detecting the presence of a foreign object, such as a metallic object or human body (including animal body), in a vicinity. The foreign object detector includes an oscillator circuit 100 that is configured to output a voltage that oscillates at predetermined cycles and an electric circuit 150 that includes a measurement circuit 300 for measuring a voltage output from the oscillator circuit 100. The oscillator circuit 100 includes a coil 110 and resonant capacitors Cx, Cy and is configured to output voltage which includes an AC component, including positive cycles and negative cycles, and a DC component (also herein referred to as "DC voltage"). The variation of this voltage is measured by the measurement circuit 300, whereby the presence of a foreign object, such as a metallic object or human body, in a vicinity of the coil 110 and the resonant capacitors Cx, Cy can be detected. Hereinafter, the description focuses on detection of a metallic foreign object.

Figure 2:
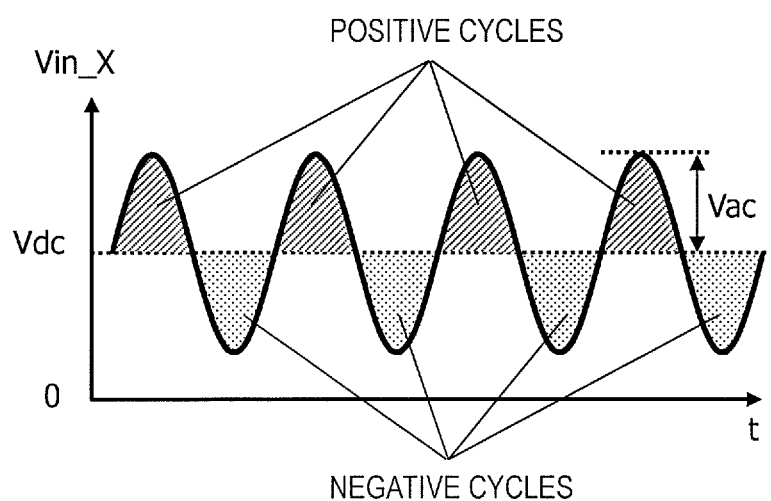
FIG. 2 is a diagram showing an example of the variation over time of output voltage Vin_X at an output terminal X of an oscillator circuit 100.

FIG. 2 is a diagram showing an example of the variation over time of output voltage Vin_X (hereinafter, also referred to as "oscillation waveform") from an output terminal X during oscillation of the oscillator circuit 100 for a foreign object detection operation. In the circuit configuration shown in FIG. 1, voltage Vin_X has a sinusoidal waveform whose oscillation center is at a certain voltage Vdc. In voltage Vin_X, voltage Vdc of the oscillation center is referred to as "DC voltage". Thus, in this specification, the term "DC voltage" refers not only to a voltage whose polarity does not vary with time but also to a "DC component" included in a certain voltage. In voltage Vin_X, a cycle during which the voltage is larger than voltage Vdc is referred to as "positive cycle", and a cycle during which the voltage is smaller than voltage Vdc is referred to as "negative cycle". The output waveform of this oscillator circuit is merely exemplary. The waveform of the above-described output voltage includes all of periodically-varying waveforms, such as triangular waves and square waves.

The oscillator circuit 100 includes an inverter INV and resistances Rf, Rd in addition to the coil 110 and the resonant capacitors Cx, Cy. The inverter INV is a circuit component which is configured to amplify an input waveform based on electric power supplied from an unshown power supply. The resistance Rf and the resistance Rd of the oscillator circuit 100 are elements configured to adjust the excitation level of the circuit. One electrode of the resonant capacitor Cx is connected to the output terminal of the coil 110 and the oscillator circuit 100 (a terminal connected to an electronic circuit 150). The two resonant capacitors Cx, Cy are connected in parallel to the coil 110. One electrode of each of the resonant capacitors Cx, Cy is grounded.

The measurement circuit 300 is configured to output information indicating that a metallic foreign object is present when the voltage output from the oscillator circuit 100 is not more than a predetermined threshold. This information indicative of the detection result can be, for example, output to an unshown display device or transmitted to a control circuit of the wireless power transmission system for use in control of power transmission. Examples of such control will be described later in the sections of Embodiments 6 and 7. The measurement circuit 300 can be realized by, for example, an analog-digital conversion circuit (ADC) or comparator, or a microcontroller unit (MCU) or digital signal processor (DSP) including such components.

Hereinafter, the operation principle of the foreign object detector of the present embodiment is described in more detail with reference to FIG. 1 and FIG. 2.

First, in FIG. 1, as an example of the oscillator circuit 100, a gate oscillator circuit which operates on supply voltage Vdd is used. The foreign object detector takes out the output voltage from the node X of the coil 110 and the capacitor Cx and measures the output voltage using the measurement circuit 300. The measurement circuit 300 is capable of measuring the voltage in the range of $0 \leq Vout < Vcc$.

The measurement circuit 300 of the present embodiment is a circuit component included in the electric circuit 150. The electric circuit 150 detects, by the measurement circuit 300, the variation of the AC component including positive cycles and negative cycles and the variation of the DC component in the voltage output from the oscillator circuit 100. Here, the "variation" includes every type of variation in the waveform, such as decrease and increase in amplitude of the oscillation waveform and deformation of the waveform.

When the oscillator circuit 100 oscillates and reaches a steady state, the polarity of the cycles of the oscillation waveform varies at angular frequency ω with the passage of time t. Thus, voltage Vin_X at the node X is represented by formula (1) as follows:

$$Vin\_X = Vdc(Q) + Vac(Q) \times \sin(\omega t) \quad (1)$$

Here, t is the time, ω is the angular frequency of the oscillation waveform, Vdc is the DC voltage which varies depending on the Q factor, and Vac is the amplitude value of the oscillation waveform which varies depending on the Q factor. As shown in FIG. 2, periods of Vac(Q)×sin(ωt)>0 are positive cycles, and periods of Vac(Q)×sin(ωt)<0 are negative cycles. When a CMOS inverter is used for the inverter INV, Vdc is usually lower than Vdd/2 due to variations in the semiconductor and losses, although Vdc=Vdd/2 holds under ideal conditions. In this configuration example of the oscillator circuit 100, when a metallic foreign object approaches the coil 110, the Q factor of a resonant circuit consisting of the coil 110 and the resonant capacitors Cx, Cy decreases, and accordingly, the stability of the oscillator circuit decreases, and Vdc and Vac also decrease. That is, the AC component including positive cycles and negative cycles and the DC component vary.

One of examples of the method for measuring amplitude value Vac and DC voltage Vdc uses an ADC which has a sufficient sampling rate as compared with the period of the oscillation waveform. For example, output waveform Vin_X of the oscillator circuit 100 is directly sampled, and Vac and Vdc can be digitally calculated by the operations of the following formulae:

$$Vac = (\max(Vin\_X) - \min(Vin\_X)) \div 2 \quad (2)$$

$$Vdc = \text{avg}(Vin\_X) \quad (3)$$

Here, max(·) is the maximum of measured values, min(·) is the minimum of measured values, and avg(·) is the average for measured values from one period of the oscillation waveform.

One of examples of the method for analog measurement of amplitude value Vac of the oscillation waveform uses a peak hold circuit. One of examples of the method for analog measurement of DC voltage Vdc uses a low pass filter. Another example method is a contactless measurement method in which a magnetic sensor, such as a Hall element, is provided near the node X of the oscillator circuit 100, and a resultant output voltage is amplified.

Major conventional sensing methods focus on a variation in amplitude value Vac of the AC voltage which occurs when a metallic foreign object is present in a vicinity of the coil. According to the present application, the oscillator circuit 100 is configured such that not only the AC component but also the DC component vary when a metallic foreign object is present in a vicinity of the coil, and the oscillator circuit 100 includes a measurement circuit which is capable of measuring the variations of Vac and Vdc, and hence, a foreign object can be detected with high sensitivity as compared with conventional methods. Specific degrees of improvement in the sensing sensitivity will be described later in the section of Example 1.

Note that, in FIG. 1, the above-described range of the output voltage can also be further expanded by selecting different values for the capacitances of the capacitors Cx, Cy. Specifically, where the capacitance of the resonant capacitor Cx connected to the node X shown in FIG. 1 is Cx, the voltage is Vx, the capacitance of the resonant capacitor Cy connected to the node Y is Cy=αCx, and the voltage is Vy, Vx=α|Vy| holds. Therefore, voltage Vin_X input to the electric circuit 150 is equal to α times Vy. In the case where the oscillation voltage of the oscillator circuit 100 is not sufficiently large, or in the case where the range of a voltage which can be measured by the measurement circuit 300 is greater than that of the supply voltage of the oscillator circuit 100, the voltage input to the measurement circuit 300 can be increased by unbalancing the ratio between the capacitances of the above-described capacitors. The range set for α can be, for example, including the case of Cx=Cy. When, on the contrary, voltage Vin input to the measurement circuit 300 is desired to be low, α can be set to, for example, a value within the range of 0.01≤α<1. If the balance between Cx and Cy is excessively disturbed, the stability of oscillation will deteriorate. Therefore, the aforementioned value of α needs to be appropriately selected according to the system configuration.

Other examples of the oscillator circuit 100 than the gate oscillator circuit such as shown in FIG. 1 include known oscillator circuits which base on the LC resonance principle, such as Colpitts oscillator circuits, Hartley oscillator circuits, Clapp oscillator circuits, and Franklin oscillator circuits. The oscillator circuit 100 may include at least one coil and at least one resonant capacitor which constitute a resonant circuit and may be configured to output a voltage which includes positive cycles, negative cycles, and a DC voltage.

The damping resistance Rd is set to an appropriate value according to other circuit constants or the detection performance of the measurement circuit 300. For example, the damping resistance Rd can be set such that when a metallic foreign object is sufficiently distant from the coil 110, voltage Vout input to the measurement circuit 300 is within the measurable range of the measurement circuit 300, and that when a metallic foreign object which is greater than the coil 110 is in close contact with the coil 110, voltage Vout is not less than the lower limit of the measurable range.

Note that although in the example shown in FIG. 1 the damping resistance Rd is connected to the output stage of the oscillator circuit 100 (between the inverter INV and the node X), it may be connected at any other position. The damping resistance Rd may be placed at the input stage, the output stage, or an arbitrary position in both of these stages so long as it is positioned such that the voltage output from the oscillator circuit 100 decreases.

Embodiment 2

Figure 3:
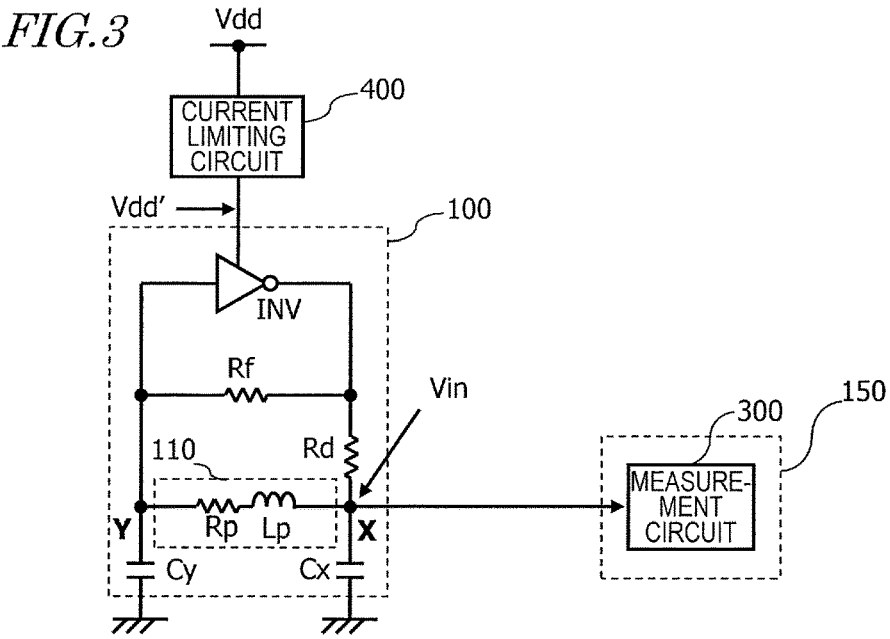
FIG. 3 is a circuit diagram showing a general configuration of a foreign object detector according to Embodiment 2 of the present disclosure.

FIG. 3 is a circuit diagram showing a general configuration of a foreign object detector according to Embodiment 2 of the present disclosure. The present embodiment is different from Embodiment 1 in that a current limiting circuit 400 is further provided between an amplifying part (amplifier circuit) of the oscillator circuit 100 and the power supply Vdd. This configuration enables the amplitude of the positive cycles, the amplitude of the negative cycles, and the DC voltage in voltage Vin output from the oscillator circuit 100 to further vary when a foreign object is present in a vicinity.

Usually, the power supply of the amplifying part of the oscillator circuit does not include the current limiting circuit 400. Therefore, when an energy loss occurs due to the presence of a foreign object in a vicinity of the coil, decrease of the oscillation voltage occurs. In that case, the amplifying part of the oscillator circuit operates to amplify the power such that the lost energy is recovered and the oscillation continues. When the supply voltage of the amplifier circuit is constant, the current is increased for recovery of the lost energy, and the value of the current flowing from the power supply into the amplifier circuit increases.

In the present embodiment, the current limiting circuit 400 is connected between the power supply and the amplifying part, such that the upper limit of the value of the current flowing into the amplifying part can be set irrespective of the presence/absence of a foreign object in a vicinity. In this case, for the purpose of sustaining the oscillation, the oscillator circuit 100 operates to decrease supply voltage Vdd' of the amplifying part such that the energy loss caused by a foreign object approaching the coil is reduced. As a result, this leads to concurrent decrease of the three components, the voltage of the positive cycles, the voltage of the negative cycles, and the DC voltage, and the measurement circuit 300 can detect decrease of these voltages. According to the principle described hereinabove, the presence of a foreign object in a vicinity can be detected with higher sensitivity.

Embodiment 3

FIGS. 4A to 4E are circuit diagrams showing a general configuration of an oscillator circuit in a foreign object detector according to Embodiment 3 of the present disclosure. The present embodiment is different form Embodiment 1 in that the oscillator circuit includes a plurality of coils. Hereinafter, the description focuses on the differences from Embodiment 1.

Figure 4A:
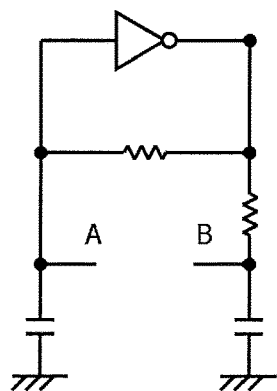
FIG. 4A is a circuit diagram showing a general configuration of an oscillator circuit in a foreign object detector according to Embodiment 3 of the present disclosure.

In the case of expanding the sensing area, the sensing area can be expanded in space and plane by arranging a plurality of coils. However, there is a problem that providing an oscillator circuit for each coil leads to increase in cost and increase in circuit area. In view of such, in the present embodiment, as shown in FIG. 4A, a plurality of coils are connected between terminals A and B, with the terminals A and B being employed as the connecting points to the oscillator circuit. Hereinafter, some possible connection examples are described.

Figure 4B:
FIG. 4B is a diagram showing the first connection example between terminals A and B in the oscillator circuit.

FIG. 4B shows a configuration example where two coils, coil #1 and coil #2, are connected in series. When a plurality of coils are connected in series, the total inductance is large as compared with a case where a single coil of the same specifications is used. Therefore, there is an advantage that, in the case where the oscillation frequency is desired to be fixed, the capacitance of the resonant capacitor can be decreased. The time constant before the oscillation becomes stable is determined by the product of the capacitance of the resonant capacitor and the damping resistance. Therefore, there is another advantage that, due to the decrease of the capacitance of the resonant capacitor, the time before the start of the oscillation can be shortened.

Figure 4C:
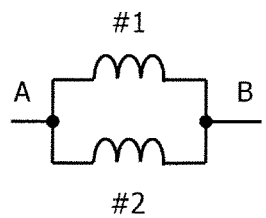
FIG. 4C is a diagram showing the second connection example between terminals A and B in the oscillator circuit.

FIG. 4C shows a configuration example where two coils, coil #1 and coil #2, are connected in parallel. When a plurality of coils are connected in parallel, the total inductance is small as compared with a case where a single coil of the same specifications is used. Therefore, there is an advantage that, in the case where the capacitance of the resonant capacitor is desired to be fixed, the oscillation frequency can be set high. Since the surface skin depth of the a foreign object decreases as the oscillation frequency becomes higher, the eddy current loss also increases. Therefore, there is an outstanding advantage that sensing with still higher sensitivity can be realized.

Figure 4D:
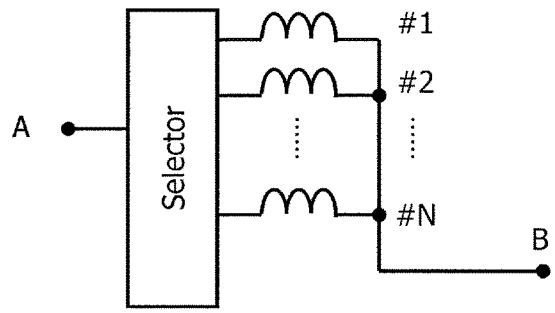
FIG. 4D is a diagram showing the third connection example between terminals A and B in the oscillator circuit.

FIG. 4D shows a configuration example where a plurality of coils, coil #1 to coil #N, and a selector (multiplexer or switch) are connected between terminals A and B. By using the selector to select at least one of the plurality of coils, it can be determined which of the coils is present in a vicinity of a foreign object. For example, in the case where the foreign object detector is placed on a power transmitter (e.g., battery charger cradle) in the wireless power transmission system and a metallic foreign object is placed on that power transmitter, a coil which is present in a vicinity of that foreign object can be determined. Therefore, there is an advantage that, in the case where coils for detection of foreign objects are configured to also function as power transmitting coils, coils other than a coil for which the presence of a foreign object in a vicinity is detected can be used for safely achieving power transmission. Even in the case of a configuration where coils for detection of foreign objects and power transmitting coils are separately provided, there is an advantage that a coil for power transmission which is at a position distant from a coil for which the presence of a foreign object in a vicinity is detected can be selected for safely achieving power transmission.

Figure 4E:
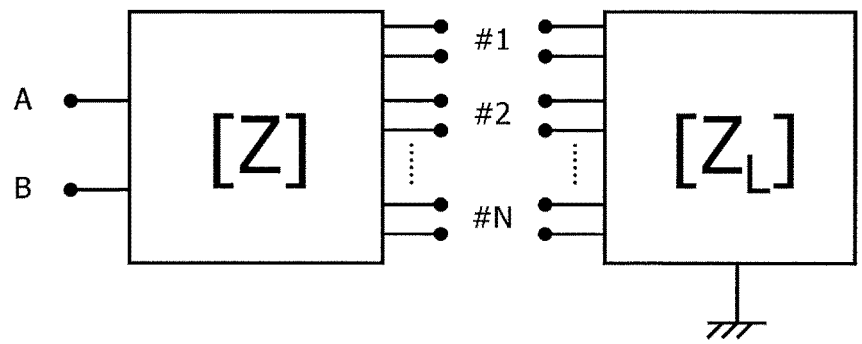
FIG. 4E is a diagram showing the fourth connection example between terminals A and B in the oscillator circuit.

FIG. 4E is a block diagram showing a generalized configuration of the present embodiment. The electric characteristics of N coils can be expressed by an N×N impedance matrix Z including the self-impedance and the mutual impedance, and can be realized by a model where impedance matrix $Z_L$ (including capacitors, inductors, resistances, and openings and short circuits) is connected at the tips of N coil terminals. Although details are not described herein because they could depart from the purport of the present disclosure, even in the case of a plurality of coils, basically, there is an advantage that high sensitivity sensing of a foreign object which covers a large target sensing area can be realized no matter what coil arrangement is employed so long as connecting terminals are drawn out such that the portion between the terminals A and B appears inductive.

Embodiment 4

Figure 5:
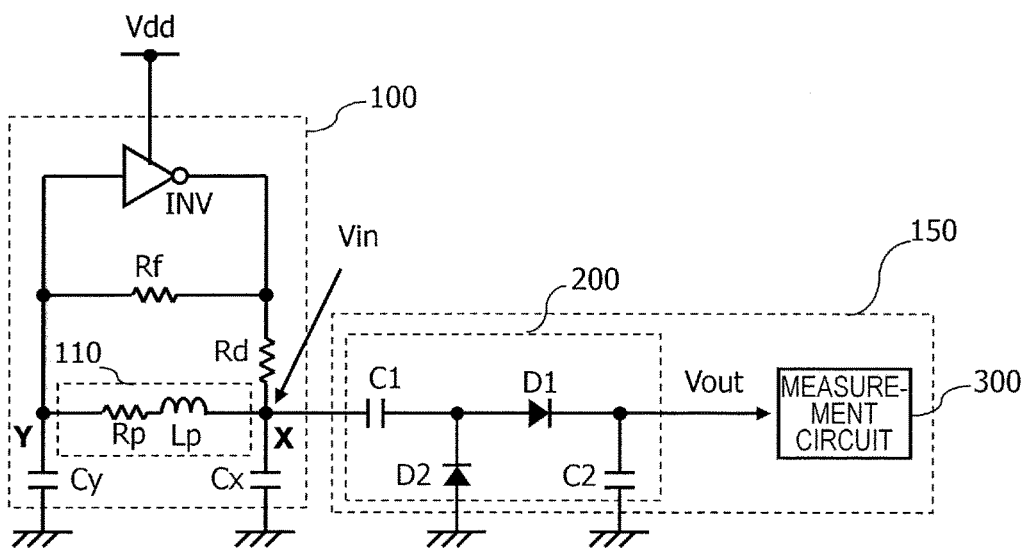
FIG. 5 is a circuit diagram showing an example of the general configuration of an oscillator circuit in a foreign object detector according to Embodiment 4 of the present disclosure.

FIG. 5 is a circuit diagram showing an example of the general configuration of a foreign object detector according to Embodiment 4 of the present disclosure (the third circuit example which will be described later). The present embodiment is different from Embodiment 1 in that a rectifier circuit 200 is further provided between an output point X of the oscillator circuit 100 and the measurement circuit 300. In the configuration example of FIG. 5, the rectifier circuit 200 and the measurement circuit 300 constitute the electric circuit 150. Note that although the foreign object detector of the present embodiment includes the measurement circuit 300, the measurement circuit 300 may be an external element which is connected to the foreign object detector for use.

The rectifier circuit 200 includes a first rectifying element D1 for rectifying the voltage of positive cycles in voltage Vin output from the oscillator circuit 100, a first capacitor C1 for decreasing the DC voltage, a second rectifying element D2 for rectifying the voltage of negative cycles which is smaller than zero (0) due to decrease of the DC voltage, and a second capacitor C2 for smoothing the voltage output from the first rectifying element D1. The rectifying elements D1, D2 can be realized by using semiconductor elements, such as diodes and transistors.

Figure 6:
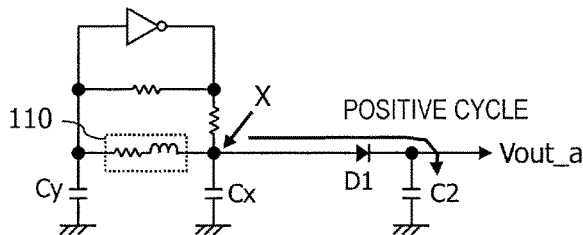
FIG. 6 shows diagrams for illustrating the first circuit example and its operation in Embodiment 4.
Figure 6:
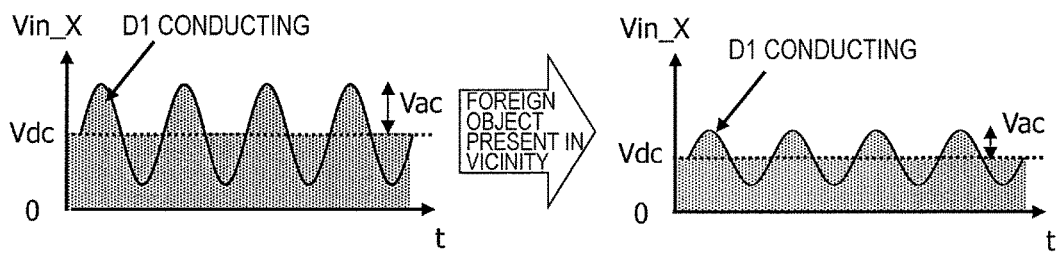
Figure 6:
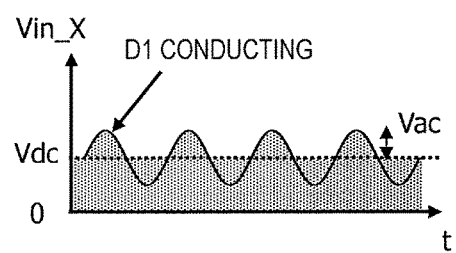
Figure 7:
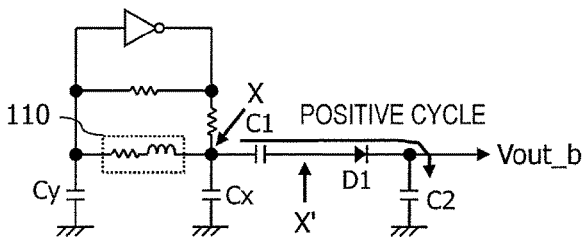
FIG. 7 shows diagrams for illustrating the second circuit example and its operation in Embodiment 4.
Figure 7:
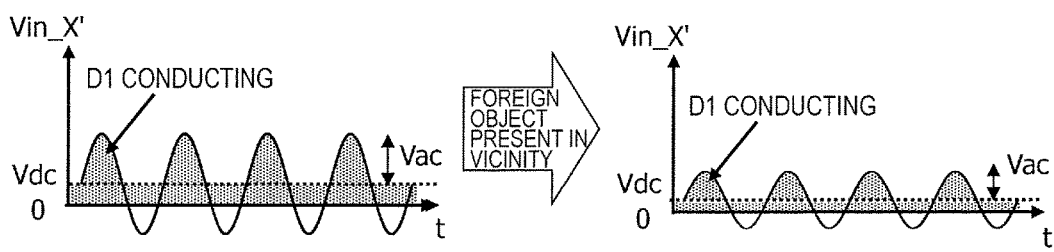
Figure 7:
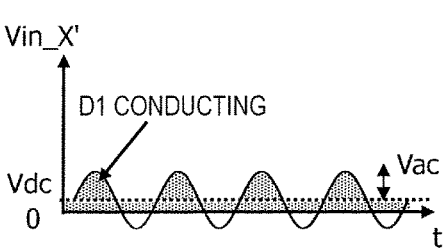
Figure 8:
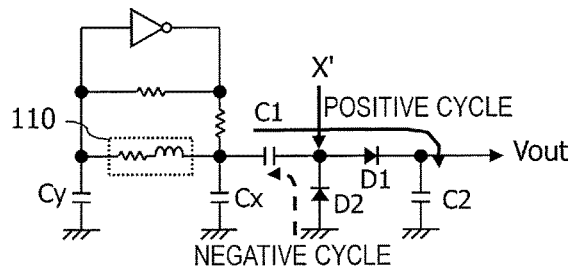
FIG. 8 shows diagrams for illustrating the third circuit example and its operation in Embodiment 4.
Figure 8:
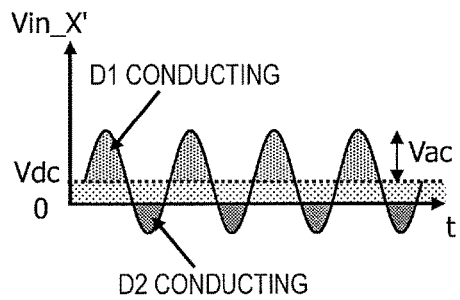
Figure 8:
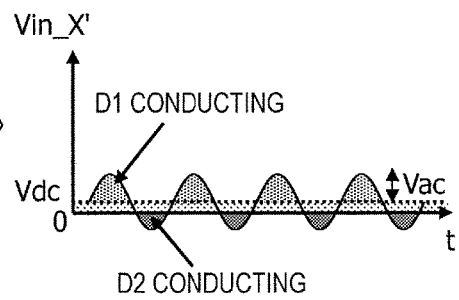

FIG. 6 to FIG. 8 are diagrams (circuit examples) for illustrating the configuration and operation of the foreign object detector of the present embodiment. Hereinafter, the operation principle of the foreign object detector of the present embodiment is described in more detail with reference to FIG. 6 to FIG. 8. FIG. 6 shows the first circuit example. FIG. 7 shows the second circuit example. FIG. 8 shows the third circuit example. The configuration shown in FIG. 8 is the best configuration of the present embodiment.

The summary of common operations among all of the configurations of FIG. 6 to FIG. 8 is now described. In these examples, a gate oscillator circuit which operates on supply voltage Vdd is used as an example of the oscillator circuit 100. The foreign object detector takes out the output voltage from the node X of the coil 110 and the capacitor Cx, allows the output voltage to flow through the rectifying element D1 and to be smoothed by the capacitor C2, and measures voltage Vout from the output terminal (Vout_a of FIG. 6 or Vout_b of FIG. 7) using the measurement circuit 300. The measurement circuit 300 is capable of measuring the voltage in the range of 0≤Vout<Vcc.

Next, circuit examples of the rectifier circuit 200 are described in the order of FIG. 6 to FIG. 8.

The first circuit example shown in FIG. 6(*a*) is a half-wave rectifier circuit which includes a diode (rectifying element) D1. FIG. 6(*b*) shows an example of the variation over time of voltage Vin_X at the node X. FIG. 6(*c*) shows an example of the variation over time of voltage Vin_X which occurs when a metallic foreign object approaches the coil 110. The diode D1 mainly rectifies the voltage of positive cycles and the DC voltage during oscillation of the oscillator circuit 100. Therefore, variations in voltage which result from a variation of the Q factor of the resonant circuit which is caused by the presence of the a metallic foreign object in a vicinity mainly occur in positive cycles of the AC voltage and in the DC voltage. The final range of output voltage Vout_a is Vdd/2≤Vout_a<Vdd when forward voltage VF of the diode D1 and the like are ignored. Therefore, in the case of supply voltage Vdd=Vcc, there is an advantage that high sensitivity sensing can be realized using a small number of components, although the operation over the entire range of 0≤Vout<Vcc, which is the measurable range of the measurement circuit, is impossible.

The second circuit example shown in FIG. 7(*a*) is a rectifier circuit which has a configuration realized by adding a capacitor C1 to the half-wave rectifier circuit of the first circuit example (FIG. 6). The capacitor C1 is connected in series between the node X and the diode D1. FIG. 7(*b*) shows an example of the variation over time of voltage Vin_X' at a point X' between the capacitor C1 and the diode D1. FIG. 7(*c*) shows an example of the variation over time of voltage Vin_X' which occurs when a metallic foreign object approaches the coil 110. Output voltage Vout_b of this circuit has a relationship with output voltage Vout_a of the rectifier circuit shown in FIG. 6. This relationship is represented by the following formula (4):

$$Vout\_b = C1/(C1+C2) \times Vout\_a \quad (4)$$

That is, the capacitor C1 cooperates with the smoothing capacitor C2 as a voltage-dividing capacitor which determines the voltage division ratio, U=C1/(C1+C2). Therefore, in this specification, the capacitor C1 is also referred to as "voltage-dividing capacitor". Due to the effect of this voltage-dividing capacitor C1, the DC voltage at the point X' is lower than the DC voltage at the node X as illustrated in FIGS. 7(*b*) and 7(*c*). Note that the range of Vout_b is U×Vdd/2≤Vout_b<U×Vdd when forward voltage VF of the diode and the like are ignored because the rectifying element D1 mainly rectifies positive cycles and the DC voltage. Therefore, in the case of supply voltage Vcc=Vdd, there is another advantage that high sensitivity sensing can be realized and the power consumption by the measurement circuit can be reduced so long as it is in a low-voltage operation where the supply voltage of the measurement circuit is Vcc=U×Vdd, although the operation over the entire range of 0≤Vout<Vcc, which is the measurable range of the measurement circuit, is impossible.

The third circuit example shown in FIG. 8(*a*) further includes a diode D2 connected between the node X' and the ground in addition to the components of the rectifier circuit of the second circuit example (FIG. 7). FIG. 8(*b*) shows an example of the variation over time of voltage Vin_X' at the node X'. FIG. 8(*c*) shows an example of the variation over time of voltage Vin_X' which occurs when a metallic foreign object approaches the coil 110. Also in this circuit example, as in the second circuit example, DC voltage Vdc decreases due to the effect of the voltage-dividing capacitor C1, and DC voltage Vdc also decreases due to decrease of the Q factor which is caused by the approach of a foreign object. The diode D2 has the effect of rectifying the voltage of negative cycles which is smaller than zero (0) due to decrease of the DC voltage (DC component) which is caused by the voltage-dividing capacitor C1. Therefore, the maximum output voltage after the rectification is 2×Vac≈Vdd because of synthesis of positive and negative cycle components. Note that, however, since the rectification effect of the diode D2 decreases as the Q factor decreases, the operation mode becomes closer to the second circuit example (FIG. 7). Thus, the minimum output voltage obtained by the rectification is U×Vdd/2. In summary, in the present embodiment, the final range of output voltage Vout is U×Vdd/2≤Vout<Vdd.

The measurement circuit 300 is capable of measuring the voltage in the range of 0≤Vout<Vcc. It is understood that the sensing sensitivity to foreign objects can be maximized by decreasing voltage division ratio U. That is, by making voltage division ratio U closer to 0, the lower limit value of the output voltage, U×Vdd/2, can be decreased to a value near 0 V. In order to make the lower limit value lower than that of the first circuit example (FIG. 6), it is only necessary to set U to a value which is greater than 0 and smaller than 1. In order to make the lower limit value considerably lower than that of the first circuit example, it is desirable to set U to a value which is greater than 0 and equal to or smaller than 0.5. It is more desirable to set U to a value which is equal to or greater than 0.001 and equal to or smaller than 0.5. For example, when Vdd=5 V and U=0.001, the range of Vout is 2.5 mV≤Vout<5V. If the measurement circuit 300 is an ADC which has the detection performance of, for example, 10 bits (1024 grades), it has the resolution of 5÷1024≈4.88 mV for 1 bit. In this case, the output range of the ADC is 1 to 1023, which means that the measurement is possible generally over the full range, and higher sensitivity of the sensing can be achieved.

As described above, the foreign object detector of the present embodiment includes the oscillator circuit 100 which includes the coil 110 and the resonant capacitors Cx, Cy and which is configured to output a voltage including positive cycles, negative cycles, and the DC voltage, and the rectifier circuit 200 which is connected to the oscillator circuit 100 and which is configured to rectify a voltage output from the oscillator circuit 100. The rectifier circuit 200 is configured to detect the amplitude of the positive cycles, the amplitude of the negative cycles, and decrease of the DC voltage in the voltage output from the oscillator circuit 100 when a metallic foreign object approaches the coil 110. Now, the third circuit example, which is the best configuration, is described more specifically. The rectifier circuit 200 includes the first rectifying element D1 for rectifying the voltage of positive cycles, the first capacitor C1 for decreasing the DC voltage, and the second rectifying element D2 for rectifying the voltage of negative cycles which is smaller than zero (0) due to decrease of the DC voltage. The rectifier circuit 200 further includes the second capacitor C2 for smoothing the voltage output from the first rectifying element D1, and is configured to meet, for example, 0<U≤0.5 where U is the voltage division ratio between the first capacitor C1 and the second capacitor C2.

Since the above-described configuration enables to decrease the lower limit value of the voltage output from the rectifier circuit 200, the detection performance of the measurement circuit 300 can be effectively utilized, and the detection sensitivity can be improved. According to the present embodiment, the detection sensitivity can be improved without providing an amplifier circuit at a stage previous to the measurement circuit 300, and therefore, a foreign object detector of high sensitivity can be realized by an inexpensive circuit configuration.

Figure 9:
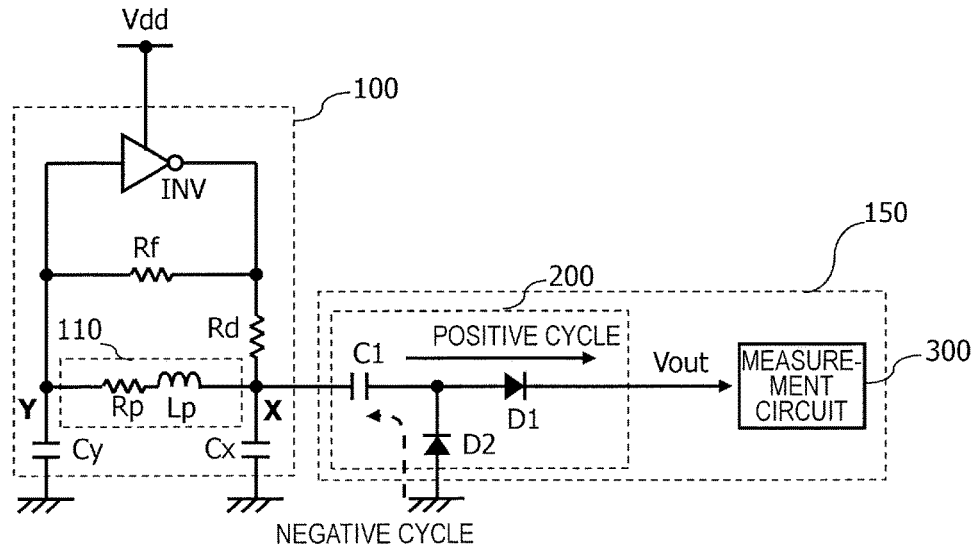
FIG. 9 is a diagram showing a variation of Embodiment 4.

Note that the foreign object detector of the present embodiment is not limited to the configurations shown in FIG. 5 to FIG. 8 but may be modified as necessary. For example, as shown in FIG. 9, the smoothing capacitor C2 may be omitted from the third circuit example. In this case, voltage Vout input to the measurement circuit 300 is an AC voltage, and therefore, it is necessary to use, as the measurement circuit 300, an ADC whose sampling rate is relatively high so as to be capable of measuring the variation of the AC voltage.

The rectifier circuit 200 is not limited to the configurations shown in FIG. 5 to FIG. 9 but only needs to be configured to detect the amplitude of the positive cycles, the amplitude of the negative cycles, and decrease of the DC voltage in the voltage output from the oscillator circuit 100 when a metallic foreign object approaches the coil 110.

Embodiment 5

Figure 10:
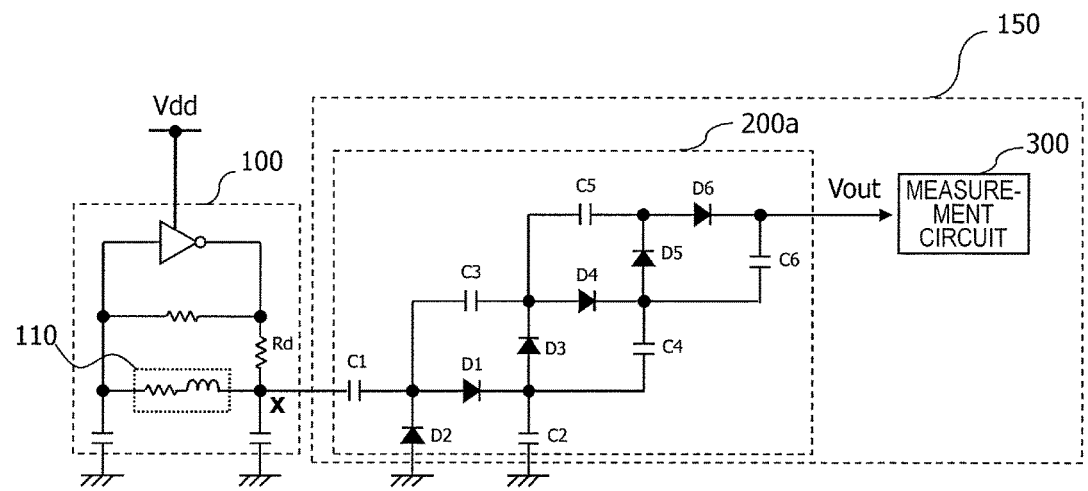
FIG. 10 is a circuit diagram showing a general configuration of a foreign object detector according to Embodiment 5 of the present disclosure.

FIG. 10 is a circuit diagram showing a general configuration of a foreign object detector according to Embodiment 5 of the present disclosure. The foreign object detector of the present embodiment is different from Embodiment 4 in that a rectifier circuit 200a corresponding to the rectifier circuit 200 of Embodiment 4 has a multi-stage configuration and that the value of the damping resistance Rd is increased such that voltage Vout input to the measurement circuit 300 is within the measurable range of the measurement circuit 300. Hereinafter, only the differences from Embodiment 4 are described while descriptions of common aspects are omitted.

If the oscillation level of the oscillator circuit 100 used for detection of foreign objects is large, there is a probability that noise is radiated from coil parts, and the noise affects external electronic devices. In this case, the oscillation level can be suppressed to a low level by setting the value of the damping resistance Rd to a large value, such as several kilo-ohms (kΩ). However, concurrently, the sensing sensitivity to foreign objects also decreases. To solve such a problem, the rectifier circuit of the present embodiment has a multi-stage configuration such that the output voltage that can be taken out can be increased twofold, fourfold, or more. Thus, the present embodiment has such an advantage that both improvement in sensitivity and low noise level can be achieved.

Embodiment 6

Figure 11:
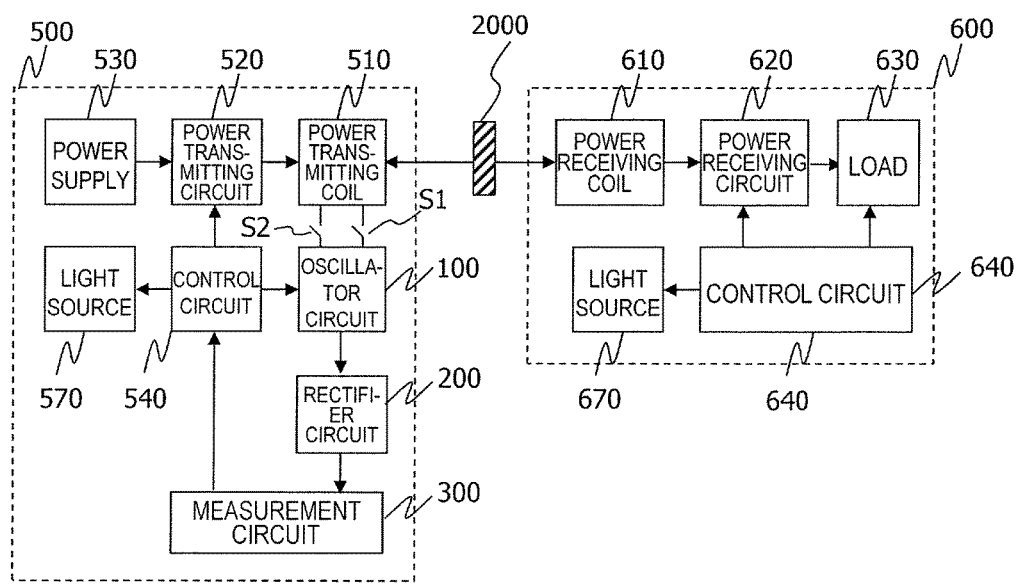
FIG. 11 is a block diagram showing a general configuration of a wireless power transmission system according to Embodiment 6 of the present disclosure.

FIG. 11 is a block diagram showing a general configuration of a wireless power transmission system according to Embodiment 5 of the present disclosure. This wireless power transmission system includes a power transmitter 500 and a power receiver 600 and is capable of transmission of electric power by wireless from the power transmitter 500 to the power receiver 600. The power transmitter 500 can be, for example, a wireless battery charger. The power receiver 600 can be, for example, a device which includes a secondary battery, such as personal digital assistants and electric vehicles. In the present embodiment, the foreign object detector according to any of the above-described embodiments is provided on the power transmitter 500 side. Thus, the power transmitter 500 is capable not only of transmitting electric power to the power receiver 600 but also of detecting whether or not a metallic foreign object 2000 is present between a power receiving coil 610 of the power receiver 600 and the power transmitting coil 510. The detection result can be imparted to a user in the form of, for example, optical information from a light source 570 of the power transmitter 500 or a light source 670 of the power receiver 600. Note that it is not limited to the light sources 570, 670. For example, a display device, such as a display or loudspeaker, may be used to impart to a user the detection result about a foreign object in the form of optical, video, or sound information. The "display device" is not limited to a display for presenting visual information but widely includes devices for presenting only aural information (sound or voice).

Thanks to such a function of the foreign object detector included in the wireless power transmission system of the present embodiment, a user can know the presence/absence of a foreign object between the power receiving coil 610 and the power transmitting coil 510 when bringing the power receiver 600 closer to the power transmitter 500. Thus, a safe transmission state can be secured.

Hereinafter, the configuration and operation of the present embodiment are described with an example which includes the foreign object detector of Embodiment 4 which has the rectifier circuit 200.

As shown in FIG. 11, the power transmitter 500 of the present embodiment includes a power transmitting coil 510, a power transmitting circuit 520, a power supply 530, an oscillator circuit 100, a rectifier circuit 200, a measurement circuit 300, and a light source 570. Of these components, the power transmitting coil 510, the oscillator circuit 100, the rectifier circuit 200, and the measurement circuit 300 constitute the foreign object detector.

The power transmitting coil 510 corresponds to the coil 110 of the above-described embodiments and is depicted in FIG. 11 as a component which is independent of the oscillator circuit 100. The power transmitting coil 510 and an unshown capacitor constitute a power transmission resonator. The power transmitting coil 510 transmits, by wireless, AC power supplied from the power transmitting circuit 520. The power transmitting coil 510 used may be a thin planar coil formed by a substrate pattern, a wound coil formed by a copper wire, a litz wire, a twisted wire, or the like. In order to secure sufficient detection sensitivity, the Q factor of a coil L1 can be set to, for example, a value not less than 100 but may be set to a value smaller than 100. Note that the power transmission resonator does not need to include a capacitor if it is unnecessary. The power transmission resonator may be formed with the inclusion of the self-resonance characteristic that the coil 510 itself has.

The oscillator circuit 100, the rectifier circuit 200, and the measurement circuit 300 are the same as those of any of the above-described embodiments. The measurement circuit 300 detects a metallic foreign object which is present in a vicinity of the power transmitting coil 510 based on the variation of the voltage output from the rectifier circuit 200. Then, the measurement circuit 300 imparts information indicative of that detection result to a control circuit 540 directly or indirectly via an unshown storage medium, such as a memory.

The power transmitting circuit 520 is a circuit for outputting an AC energy which is for power transmission after completion of foreign object detection. The power transmitting circuit 520 may be a full bridge inverter or any other type of power transmitting circuit such as class-D or class E circuit. The power transmitting circuit 520 may further include a modulation/demodulation circuit for data communication and/or a variety of sensors for measurement of voltages, currents, etc.

The power supply 530 includes a commercial power supply, a primary battery, a secondary battery, a solar cell, a fuel cell, a USB (Universal Serial Bus) power supply, a high-capacity capacitor (e.g., electric double layer capacitor), a voltage converter connected to the commercial power supply, or all of power supplies which can be realized by a combination thereof.

The power transmission control circuit 540 is a processor for controlling the operation of the entirety of the power transmitter 500 and can be realized by, for example, a combination of a CPU and a memory in which a computer program is stored. The power transmission control circuit 540 may be special-purpose hardware which is configured to realize the operation of the present embodiment. The power transmission control circuit 540 exercises control over switching of the oscillation frequency of the oscillator circuit 100, control over power transmission by the power transmitting circuit 520 (adjustment of the state of power transmission), and control over light emission of the display element 570 based on the detection result from the measurement circuit 300. Specifically, in the foreign object detection mode, the operation of the power transmitting circuit 520 is stopped, and the oscillator circuit 100 is driven. In the power transmission mode, the operation of the oscillator circuit 100 is stopped, and the power transmitting circuit 520 is driven. The power transmission control circuit 540 determines the frequency of power when starting transmission and the voltage of power to be transmitted according to the measurement result from the foreign object detector.

Other examples of the oscillator circuit 100 than the previously-described gate oscillator circuit include known oscillator circuits which base on the LC resonance principle, such as Colpitts oscillator circuits, Hartley oscillator circuits, Clapp oscillator circuits, and Franklin oscillator circuits.

The measurement circuit 300 can be, as previously described, a measuring device used for measuring the voltage output from the rectifier circuit 200, such as an ADC. Note that, although not shown, at least part of the functions of the measurement circuit 300 and at least part of the functions of the power transmission control circuit 540 may be realized by a semiconductor package (e.g., microcontroller or custom IC).

The light source 570 is configured to impart to a user the detection result obtained by the measurement circuit 300. The light source 570 can be realized by a light source, such as an LED or organic EL, or may be an aggregate of a plurality of light sources. The light source 570 may allow emission of different ones of the plurality of light sources, or vary stepwise the number of light sources which are allowed for emission, according to the distance between the power transmitting coil L1 and the power receiving coil L2 or the degree of vicinity of the a metallic foreign object. Alternatively, a display, such as a liquid crystal display device or organic EL display device, may be used instead of the light source 570. Using the display enables displaying of the detection result in the form of images or characters. Such a display device may be configured to display the detection result by means of sound or voice together with, or instead of, light.

The power transmitter 500 can operate in two modes, "foreign object detection mode" for detection of foreign objects with the use of the foreign object detector and "power transmission mode" for transmission of electric power with the use of the power transmitting circuit 520. The power transmitter 500 includes switches S1, S2 for switching between the power transmission mode and the foreign object detection mode. The power transmission control circuit 540 controls the conduction state of the switches S1, S2 such that in the foreign object detection mode the power transmitting coil 510 and the oscillator circuit 100 are electrically connected together, and in the power transmission mode the power transmitting coil 510 and the oscillator circuit 100 are electrically disconnected from each other.

The power receiver 600 includes a power receiving coil 610 for receiving at least part of the electric power transmitted from the power transmitting coil 510, a load 630, a power receiving circuit 620 for rectifying the received electric power and supplying the rectified electric power to the load 630, a light source 670 for imparting the detection result for a foreign object, and a power reception control circuit 640 for controlling respective parts of the power receiver 600.

The power receiving coil 610 and an unshown capacitor constitute a power receiving resonator. The power reception resonator is electromagnetically coupled with the power transmission resonator. The power receiving coil 610 and the capacitor may be the same as, or different from, the coil and the capacitor on the power transmission side. Note that the power receiving resonator does not need to include the capacitor if it is unnecessary. The power receiving resonator may be formed with the inclusion of the self-resonance characteristic that the coil 610 itself has.

The power receiving circuit 620 includes various circuits, such as rectifier circuit, frequency conversion circuit, constant voltage/constant current control circuit, and modulation/demodulation circuit for data communication. The power receiving circuit 620 is configured to convert the received AC energy to a DC energy or low-frequency AC energy which is usable for the load 630. Also, various sensors for measuring the voltage, current, etc., of the power receiving resonator 610 may be included in the power receiving circuit 620.

The load 630 is, for example, a secondary battery or a high-capacity capacitor and can be charged with the electric power output from the power receiving circuit 620.

The power reception control circuit 640 is a processor for controlling the operation of the entirety of the power receiver 600 and can be realized by, for example, a combination of a CPU and a memory in which a computer program is stored. The power reception control circuit 640 is not limited to this example but may be special-purpose hardware which is configured to realize the operation of the present embodiment. The power reception control circuit 640 exercises control over charging of a load 650 and control of the light source 670.

As described above, in the present embodiment, the coil for detection of foreign objects and the coil for transmission of electric power are realized by the same coil. Such a configuration enables sharing of coil parts and provides an advantage that the size of the power transmitter 500 can be reduced.

Using the power transmitting coil also as the coil for detection of foreign objects provides an advantage that the state of placement of a foreign object lying on the power transmitting coil 510 can be directly detected. This enables to adjust the power transmission frequency and the electric power to be transmitted (power transmission voltage or power transmission current) based on the voltage value measured by the measurement circuit 300. For example, if it is determined that a foreign object is present, transmission of electric power is immediately stopped, or transmission of electric power is not started. In such a case, charging is impossible, and there is a probability that the user's convenience is marred. In view of such, even if the criterial value that is the criterion for determination as to the presence/absence of a foreign object is not more than a predetermined threshold, transmission of electric power may be carried out under power transmission control such that the temperature of the a foreign object is not more than a predetermined threshold. Such control enables continuation of the power transmission while securing the safety. Specifically, electric power may be transmitted intermittently with predetermined time intervals using parameters which are determined based on data experimentally or analytically obtained in advance. Alternatively, transmission of electric power may be carried out after the electric power has been reduced at a predetermined reduction rate (power-limited mode). Still alternatively, the electric power to be transmitted may be adjusted while monitoring the temperature with the use of a temperature sensor placed near the power transmitting coil 510.

Figure 12:
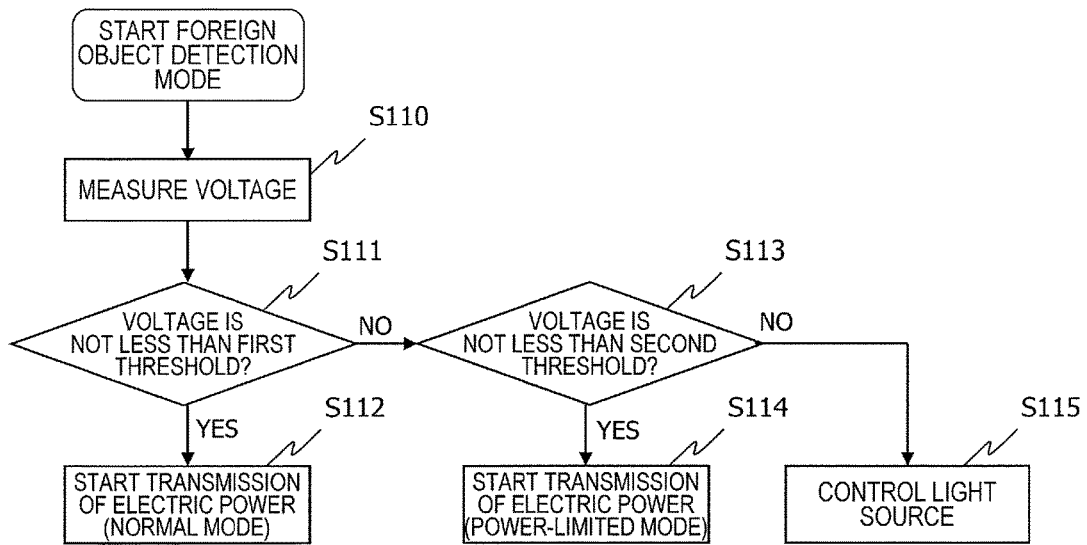
FIG. 12 is a flowchart showing an example of a process of a power transmitter in Embodiment 6.

FIG. 12 is a flowchart showing an example of the process of the power transmitter 500 of the present embodiment. When the foreign object detection mode is started, firstly at step S110, the measurement circuit 300 measures the voltage output from the rectifier circuit 200. Then, at step S111, the measurement circuit 300 determines whether or not the measured voltage is not less than the first threshold. If the measured voltage is not less than the first threshold, no foreign object is present. Then, the process proceeds to step S112, and transmission of electric power is started (normal power transmission). If the measured voltage is less than the first threshold, it is assumed that a foreign object is present. Then, the process proceeds to step S113, and the measurement circuit 300 determines whether or not that voltage is not less than the second threshold. If the voltage is not less than the second threshold, the measurement circuit 300 determines that the a foreign object is so small that generation of heat is negligible and imparts the information about the determination to the power transmission control circuit 540. Receiving that information, the power transmission control circuit 540 selects the above-described power-limited mode and starts transmission of electric power (step S114). At step S113, if the voltage is less than the second threshold, the measurement circuit 300 determines that a large foreign object is present and imparts the information about the determination to the power transmission control circuit 540. Receiving that information, the power transmission control circuit 540 orders the light source 570 (e.g., LED) to flash, for example, thereby informing a user that a foreign object is present (step S115).

Note that, in wireless power transmission, electric power of several watts to several kilowatts, for example, is transmitted from the power transmitting coil 510 to the power receiving coil 610. Therefore, if the operation transitions from the power transmission mode to the foreign object detection mode during the power transmission, there is a probability that accumulated energy in the coil flows into a circuit that is for detection of foreign objects, and the withstand voltage of the circuit that is for detection of foreign objects is exceeded so that a burnout can occur. In view of such, according to the present embodiment, the energy accumulated in the power transmitting coil 510 during wireless power transmission is released to the ground before the operation transitions to the foreign object detection mode. This arrangement enables to prevent a burnout of the circuit that is for detection of foreign objects. Specifically, when the operation is switched from the power transmission mode to the foreign object detection mode, among the inverters included in the power transmitting circuit 520, the switch of a switching element which is directly connected to the ground (e.g., MOSFET) is firstly turned ON. This enables the energy accumulated in the power transmitting coil 510 to be released to the ground. Then, the foreign object detection mode may be started after a predetermined time period has passed.

Note that, in the present embodiment, the power transmitting coil 510 is configured to also function as the coil for detection of foreign objects, although the present disclosure is not limited to such an example. The coil for transmission of electric power and the coil for detection of foreign objects may be realized by different coils.

Embodiment 7

Figure 13:
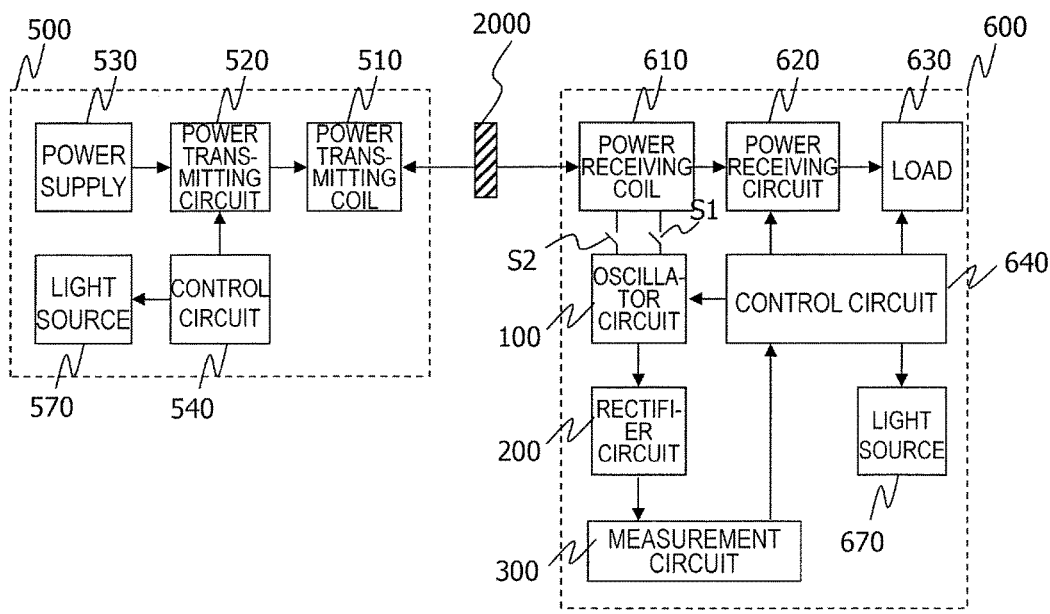
FIG. 13 is a block diagram showing a general configuration of a wireless power transmission system according to Embodiment 7 of the present disclosure.

FIG. 13 is a block diagram showing a general configuration of a wireless power transmission system according to Embodiment 7 of the present disclosure. The present embodiment is different from Embodiment 6 in that the power receiver 600 has a foreign object detector which includes an oscillator circuit 100, a rectifier circuit 200, and a measurement circuit 300. The power receiver 600 of the present embodiment can operate in two modes, the power reception mode and the foreign object detection mode, and includes switches S1, S2 placed between the power receiving coil 610 and the oscillator circuit 100 for switching between the power reception mode and the foreign object detection mode. In the present embodiment, the respective components of the power transmitter 500 and the power receiver 600 are the same as corresponding components of Embodiment 6. Note that, also in the present embodiment, a case where the foreign object detector of Embodiment 4 which has the rectifier circuit 200 is included is illustrated, although a foreign object detector which has no rectifier circuit may be included.

Such a configuration enables sharing of coil parts and provides an advantage that the size of the power receiver 600 can be reduced. Further, the power receiving coil 610 is also employed as the coil for detection of foreign objects, and therefore, there is an advantage that the state of placement of a foreign object lying under the power receiving coil 610 can be directly detected. Due to this arrangement, a request can be made to the power transmitter 500 side to adjust the power transmission frequency and the electric power to be transmitted (voltage or current) according to the voltage value detected by the measurement circuit 300. Such a request can be made by, for example, a communication circuit included in the power receiving circuit 620. For example, if the measurement circuit 300 determines that a foreign object is present, the power transmission control circuit 540 immediately stops, or does not start, transmission of electric power. In this case, charging is impossible, and the user's convenience is marred. In view of such, even if the criterial value that is the criterion for determination as to the presence/absence of a foreign object is not more than a predetermined threshold, transmission of electric power may be carried out under power transmission control such that the temperature of the a foreign object is not more than a predetermined threshold. Such control enables continuation of the power transmission while securing the safety. Specifically, electric power may be transmitted intermittently with predetermined time intervals using parameters which are determined based on data experimentally or analytically obtained in advance. Alternatively, transmission of electric power may be carried out after the electric power has been reduced at a predetermined reduction rate (power-limited mode). Still alternatively, the electric power to be transmitted may be adjusted while monitoring the temperature with the use of a temperature sensor placed near the power receiving coil 610.

Figures 14, 15:
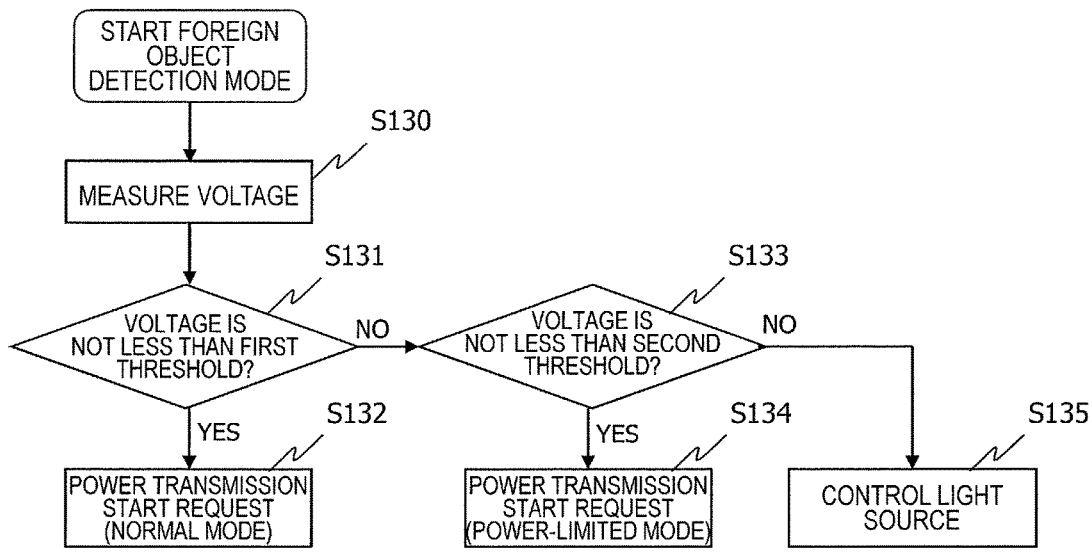
FIG. 14 is a flowchart showing an example of a process of a power receiver in Embodiment 7.
FIG. 15 is a table showing measurement results in the first example of the present disclosure.

FIG. 14 is a flowchart showing an example of a process of the power receiver 600 in the present embodiment. When the foreign object detection mode is started, firstly at step 130, the measurement circuit 300 measures the voltage output from the rectifier circuit 200. Then, at step S131, the measurement circuit 300 determines whether or not the measured voltage is not less than the first threshold. If the measured voltage is not less than the first threshold, no foreign object is present. Then, the process proceeds to step S132, and a request to start transmission of electric power is sent to the power transmitter 500 side (normal power transmission). If the measured voltage is less than the first threshold, it is assumed that a foreign object is present. Then, the process proceeds to step S133, and the measurement circuit 300 determines whether or not that voltage is not less than the second threshold. If the voltage is not less than the second threshold, the measurement circuit 300 determines that the a foreign object is so small that generation of heat is negligible and imparts the information about the determination (power transmission start request) to the power transmission control circuit 540 of the power transmitter 500 (step S134). Receiving the power transmission start request, the power transmission control circuit 540 selects the above-described power-limited mode and starts transmission of electric power. At step S133, if the voltage is less than the second threshold, the measurement circuit 300 determines that a large foreign object is present and imparts the information about the determination to the power reception control circuit 640. Receiving that information, the power reception control circuit 640 orders the light source 670 (e.g., LED) to flash, for example, thereby informing a user that a foreign object is present (step S135).

Note that, in wireless power transmission, electric power of several watts to several kilowatts, for example, is transmitted from the power transmitting coil 510 to the power receiving coil 610. Therefore, if the operation transitions from the power reception mode to the foreign object detection mode during the power transmission, there is a probability that accumulated energy in the coil flows into a circuit that is for detection of foreign objects, and the withstand voltage of the circuit that is for detection of foreign objects is exceeded so that a burnout can occur. In view of such, according to the present embodiment, the energy accumulated in the power receiving coil 610 during wireless power transmission is released to the ground before the operation transitions to the foreign object detection mode. This arrangement enables to prevent a burnout of the circuit that is for detection of foreign objects. Specifically, in the case where the rectifier circuit included in the power receiving circuit 620 is a synchronous rectifier circuit, when the operation is switched from the power reception mode to the foreign object detection mode, one of the switching elements included in the power receiving circuit 620 which is directly connected to the ground is firstly turned ON. This enables the energy accumulated in the coil inside the power receiving coil 610 to be released to the ground. Then, the foreign object detection mode may be started after a predetermined time period has passed.

Note that, in the present embodiment, the power receiving coil 610 is configured to also function as the coil for detection of foreign objects, although the present disclosure is not limited to this example. The coil for transmission of electric power and the coil for detection of foreign objects may be realized by different coils.

Example 1

An example according to Embodiment 1 and Embodiment 2 of the present disclosure is described.

In FIG. 1 and FIG. 3, a prototype of a foreign object detection circuit was produced for experiment, in which Vdd=5 V, Lp=6.5 uH, Cx=Cy=33 nF, Rd=270Ω, and Rf=1 MΩ. The measurement circuit 300 was an ADC at 2 G samples/sec. A measured waveform was once stored in a memory before amplitude value Vac of the oscillation waveform and DC voltage Vdc were calculated using formulae (2) and (3). Two types of materials, iron and aluminum foil, were selected as foreign objects to be evaluated. Measured values of the oscillation waveform obtained when the a foreign object is present in a vicinity of the coil and when the a foreign object is distant from the coil (in the absence of a foreign object) were compared. The current value supplied from power supply Vdd when the a foreign object is not present in a vicinity of the coil was 7 mA. Therefore, the current limit value of the current limiting circuit 400 was set to 8 mA. The current limiting circuit 400 was configured to operate in the constant current mode if 8 mA is exceeded.

The evaluation results are shown in the table of FIG. 15.

In the second column of the table for the constant current circuit, "NOT INCLUDED" corresponds to Embodiment 1, and "INCLUDED" corresponds to Embodiment 2. In the table, the numerical values in parentheses represent the difference between the voltage value obtained in the absence of a foreign object and the voltage value obtained in the presence of a foreign object. For example, in the case where the a foreign object to be evaluated was iron and the constant current circuit was not included, the difference in Vac was 1313−772=541 mV. This means that the amplitude of the AC voltage decreased by 541 mV due to the presence of a foreign object in a vicinity.

It is understood from the evaluation results that, irrespective of the material of the a foreign object, both amplitude Vac and DC voltage Vdc decrease when a metallic foreign object is present in a vicinity of the coil. It is also understood that, when the constant current circuit is included, the decrease of amplitude Vac and the decrease of DC voltage Vdc become greater. While in the conventional sensing methods only the variation in amplitude Vac of the AC voltage is mainly considered as the parameter to be detected, the variation of DC voltage Vdc can also be considered as the parameter to be detected in the present application in addition to the conventional parameter.

For example, in a configuration example of Embodiment 2 where the a foreign object to be evaluated was aluminum foil and the constant current circuit was included, the voltage decrease of the present application was 900+381=1281 mV, while the voltage decrease was 900 mV in the conventional methods. This means that the sensing sensitivity was improved about 42%.

Example 2

An example according to Embodiment 4 of the present disclosure is described.

Figure 16A:
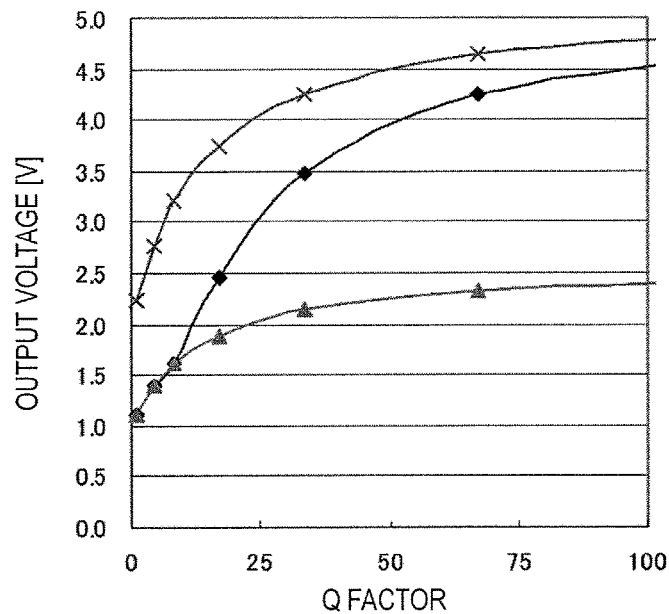
FIG. 16A is a graph showing simulation results in the second example of the present disclosure.
Figure 16B:
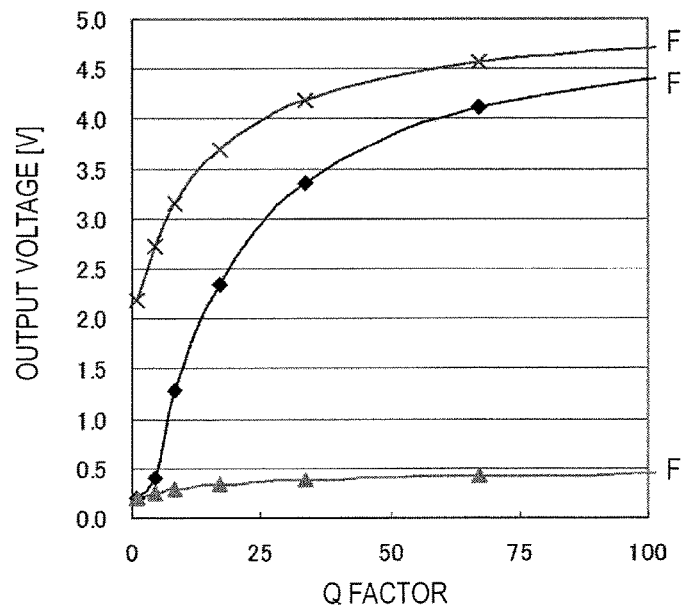
FIG. 16B is a graph showing simulation results in the second example of the present disclosure.

FIGS. 16A and 16B are graphs showing the relationship between the Q factor and the output voltage in the three circuit examples previously described with reference to FIGS. 6 to 8 in the section of Embodiment 4. With the parameters of Vdd=5 V, C1=1 nF, Rf=1 MΩ, Rd=470Ω, Cx=Cy=27 nF, and Lp=6.5 uH, the variation of resistance Rp which occurs when a foreign object is placed on the coil was simulated, where resistance Rp was varied in the range of Rp=25 to 5000 mΩ and the range of Q=0.6 to 134 was subjected to calculation. The two values for C2, C2=1 nF and C2=10 nF, were examined. The difference in output voltage Vout between the cases of different voltage division ratios, U=0.5 and U=0.091, was calculated using a circuit simulation. Note that the simulation results include the characteristics of forward voltage VF of the diode.

First, the results shown in FIG. 16A for the case of voltage division ratio U=0.5 with C1=1 nF and C2=1 nF are examined. It is seen that, in the circuit configuration of FIG. 6 (first circuit example), the lower limit voltage is Vdd/2≈2.5 V, and in the circuit configuration of FIG. 7 (second circuit example), the lower limit voltage is U×Vdd/2≈1.2 V. If the measurement circuit 300 is capable of measuring in the range of 0≤Vout<5 V, the circuit configurations shown in FIG. 6 and FIG. 7 can utilize the sensing ability only in 50% of that range. On the other hand, it can be seen that, in the circuit configuration of FIG. 8 (third circuit example), the lower limit voltage is U×Vdd/2≈1.2 V as in circuit example 2, and the upper limit voltage becomes closer to the upper limit voltage Vdd=5 V achieved in circuit example 1 as the Q factor increases. Therefore, as illustrated in the section of Embodiment 4, it is expected that decreasing voltage division ratio U enables to decrease the lower limit voltage and to increase the dynamic range of sensing.

Based on this concept, the results shown in FIG. 16B for the case of voltage division ratio U=0.091 with C1=1 nF and C2=10 nF were examined. It can be seen that, in circuit example 2 and circuit example 3, the lower limit voltage decreased to U×Vdd/2≈0.2 V. As a result, it was verified that, in circuit example 3, in the range of Q≈0 to 134, measurement is possible within the range of Vout≈0 to 5 V, and a further improvement in sensitivity can be achieved as compared with the circuit configurations of circuit examples 1 and 2.

In the foregoing sections of this specification, the description has focused on metal detection. In an embodiment of the present invention, human body detection is also possible. Specifically, when a human body (=dielectric) is present in a vicinity of the coil, the impedance of the coil varies, and the Q factor also varies. As the Q factor varies, the AC component and the DC component of the oscillation waveform vary as previously illustrated. Therefore, these variations may be detected by the measurement circuit 200. Based on the detection results, the power transmission control circuit can add a power transmission stop process and a power reduction process. This arrangement enables detection of a human body which is present in a vicinity of the coil. The risk of exposure of a human body to electromagnetic waves can be avoided.

Note that the numerical values and circuit configurations presented in this specification are merely exemplary. The invention of the present application is not limited to those numerical values and circuit configurations. The present application only provides illustration of examples of an oscillator circuit which operates at a single frequency for the purpose of focusing the description on the concept of the present invention. However, extension to "multi-frequency oscillator circuits" which further include capacitors with switches or inductors with switches, and which are capable of dynamically changing the resonant frequency of the LC resonant circuit by turning on and off these switches, is easily achieved. These can employ existing switching methods. Also, the detection accuracy of the foreign object detector of the present disclosure can be further improved by measuring the voltage at a plurality of frequencies and determining the variation of the voltage for each of the frequencies.

INDUSTRIAL APPLICABILITY

A foreign object detector and a wireless power transmission system of the present disclosure are widely applicable to uses for charging of, or for supply of electric power to, for example, electric vehicles, AV devices, batteries, medical devices, etc. According to the embodiments of the present disclosure, a foreign object, such as a metallic object or human body, which is present in a vicinity of a coil can be detected with high sensitivity, and abnormal heat generation of a metallic object and the risk of exposure of a human body can be avoided.

REFERENCE SIGNS LIST 100 oscillator circuit
110 coil
150 electric circuit
200, 200a rectifier circuit
300 measurement circuit
400 current limiting circuit
500 power transmitter
510 power transmitting coil
520 power transmitting circuit
530 power supply
540 power transmission control circuit
570 light source
600 power receiver
610 power receiving coil
620 power receiving circuit
630 load
640 power reception control circuit
670 light source
Lp inductance of coil
Rp resistance of coil
Rd damping resistance
Cx resonant capacitor
Cy resonant capacitor
C1 voltage-dividing capacitor
C2 smoothing capacitor
D1 rectifying element
D2 rectifying element
INV inverter
S1, S2 switch

The invention claimed is:

1. A foreign object detector, comprising:
    an oscillator circuit having a coil and a resonant capacitor, wherein the oscillator circuit outputs a voltage which includes an AC component and a DC component, the AC component having a positive cycle and a negative cycle; and
    an electric circuit that detects a variation of the AC component and a variation of the DC component in the voltage output from the oscillator circuit when a foreign object approaches the coil,
wherein
the coil also functions as a power transmitting coil for transmitting electric power wirelessly,
the foreign object detector further includes a switch coupled to the oscillator circuit, and
the switch electrically connects the coil to other elements of the oscillator circuit in a foreign object detection mode and to electrically separate the coil from the other elements of the oscillator circuit in a power transmission mode.

2. The foreign object detector of claim 1, wherein
the electric circuit includes a rectifier circuit that rectifies the voltage output from the oscillator circuit and outputting the rectified voltage, and
the rectifier circuit includes
a first rectifier element for rectifying a voltage of the positive cycle,
a first capacitor for reducing the DC component, and
a second rectifier element for rectifying a voltage of the negative cycle which is smaller than zero due to reduction of the DC component.

3. The foreign object detector of claim 2, wherein
the rectifier circuit further includes a second capacitor for smoothing a voltage output from the first rectifier element, and
a voltage division ratio between the first capacitor and the second capacitor, U, satisfies the relationship of $0<U\leq0.5$.

4. The foreign object detector of claim 2, wherein the electric circuit further includes a measurement circuit that measures the voltage output from the rectifier circuit.

5. The foreign object detector of claim 1, wherein the electric circuit further includes a measurement circuit that directly or indirectly measures a voltage output from the oscillator circuit.

6. The foreign object detector of claim 5, wherein
the oscillator circuit further includes a resistance Rd which is arranged so as to decrease the voltage output from the oscillator circuit, and
the resistance Rd is set such that, when the foreign object is sufficiently distant from the coil, a voltage input to the measurement circuit is within a measurable range of the measurement circuit and, when a foreign object which is larger than the coil is in close contact with the coil, the voltage is not less than a lower limit of the measurable range.

7. The foreign object detector of claim 5, wherein the measurement circuit outputs information indicating that the foreign object is present when a difference between a voltage input to the measurement circuit and a predetermined reference voltage is not less than a predetermined threshold.

8. The foreign object detector of claim 1, wherein
the resonant capacitor is a first resonant capacitor,
the oscillator circuit further includes a second resonant capacitor which has a different capacitance from that of the first resonant capacitor,
one electrode of the first resonant capacitor is connected to one terminal of the coil and an output terminal of the oscillator circuit,
one electrode of the second resonant capacitor is connected to the other terminal of the coil, and
the other electrodes of the first and second resonant capacitor are grounded.

9. The foreign object detector of claim 8, wherein
the first resonant capacitor has capacitance Cx and the second resonant capacitor has capacitance $Cy=\alpha Cx$, and
$\alpha$ is set to a value within the range of $1<\alpha<100$.

10. The foreign object detector of claim 8, wherein
the first resonant capacitor has capacitance Cx and the second resonant capacitor has capacitance $Cy=\alpha Cx$, and
$\alpha$ is set to a value within the range of $0.01\leq\alpha<1$.

11. A power transmitter for transmitting electric power by wireless, comprising:
the foreign object detector of claim 1; and
a control circuit that determines a power transmission frequency and a power transmission voltage according to a detection result from the foreign object detector.

12. A wireless power transmission system, comprising:
a power transmitter that transmits electric power by wireless; and
a power receiver that receives the electric power transmitted from the power transmitter,
wherein the power transmitter is the power transmitter of claim 11.

13. A foreign object detector, comprising:
an oscillator circuit having a coil and a resonant capacitor, wherein the oscillator circuit outputs a voltage which includes an AC component and a DC component, the AC component having a positive cycle and a negative cycle; and
an electric circuit that detects a variation of the AC component and a variation of the DC component in the voltage output from the oscillator circuit when a foreign object approaches the coil,
wherein
the coil also functions as a power receiving coil for receiving electric power by wireless,
the foreign object detector further includes a switch coupled to the oscillator circuit, and
the switch electrically connects the coil to other elements of the oscillator circuit in a foreign object detection mode and to electrically separate the coil from the other elements of the oscillator circuit in a power transmission mode.

14. A power receiver for receiving electric power transmitted by wireless from a power transmitter, comprising:
the foreign object detector of claim 13; and
a control circuit that generates information for power transmission control according to a detection result from the foreign object detector and outputs the generated information.

15. A wireless power transmission system, comprising:
a power transmitter that transmits electric power by wireless; and
a power receiver that receives the electric power transmitted from the power transmitter,
wherein the power receiver is the power receiver of claim 14.

* * * * *